United States Patent
Nessel et al.

(10) Patent No.: US 9,887,654 B2
(45) Date of Patent: Feb. 6, 2018

(54) APPARATUS EMPLOYING COIL INDUCTANCE DETERMINATION AND METHOD FOR OPERATING THE APPARATUS

(71) Applicant: SANOFI-AVENTIS DEUTSCHLAND GMBH, Frankfurt am Main (DE)

(72) Inventors: Christian Nessel, Frankfurt am Main (DE); Daniel Auernhammer, Frankfurt am Main (DE)

(73) Assignee: SANOFI-AVENTIS DEUTSCHLAND GMBH, Frankfurt am Main (DE)

( * ) Notice: Subject to any disclaimer, the term of this patent is extended or adjusted under 35 U.S.C. 154(b) by 0 days.

(21) Appl. No.: 14/888,305

(22) PCT Filed: May 6, 2014

(86) PCT No.: PCT/EP2014/059153
§ 371 (c)(1),
(2) Date: Oct. 30, 2015

(87) PCT Pub. No.: WO2014/180804
PCT Pub. Date: Nov. 13, 2014

(65) Prior Publication Data
US 2016/0079894 A1    Mar. 17, 2016

(30) Foreign Application Priority Data
May 7, 2013   (EP) ...................................... 13166900

(51) Int. Cl.
*H02P 6/14*   (2016.01)
*H02P 6/18*   (2016.01)
(Continued)

(52) U.S. Cl.
CPC ................ *H02P 6/186* (2013.01); *H02P 6/16* (2013.01); *H02P 6/185* (2013.01); *H02P 6/08* (2013.01); *H02P 6/14* (2013.01); *H02P 2203/01* (2013.01)

(58) Field of Classification Search
CPC ... H02P 6/14; H02P 6/08; H02P 6/001; H02K 29/00; H02K 29/08
(Continued)

(56) References Cited

U.S. PATENT DOCUMENTS

2008/0267796 A1* 10/2008 Sarkinen ........... A61M 5/14276
                                                                    417/411
2011/0101900 A1   5/2011 Basic et al.
(Continued)

FOREIGN PATENT DOCUMENTS

JP     2009-100527       5/2009
JP     2009100527 A  *  5/2009

OTHER PUBLICATIONS

International Search Report for Int. App. No. PCT/EP2014/059153, completed Feb. 20, 2015.

*Primary Examiner* — Kawing Chan
*Assistant Examiner* — Bradley Brown
(74) *Attorney, Agent, or Firm* — McDonnell Boehnen Hulbert & Berghoff LLP (57) ABSTRACT

The invention relates to an apparatus having an electric motor with a stator, an armature, especially a rotor, and at least one coil, wherein the apparatus further comprises detection means configured to determine the inductance L of the coil by measuring at least one electrical quantity related to the coil during operation of the motor. The invention further relates to a method for operating such an apparatus, wherein the detection means of the apparatus determine the inductance L of the coil and/or the position of the armature as a function of the inductance L of the coil by measuring at (Continued)

least one electrical quantity related to the coil during operation of the motor.

2 Claims, 6 Drawing Sheets

(51) Int. Cl.
*H02P 6/185* (2016.01)
*H02P 6/16* (2016.01)
*H02P 6/08* (2016.01)

(58) Field of Classification Search
USPC .................................................. 318/400.26
See application file for complete search history.

(56) References Cited

U.S. PATENT DOCUMENTS

2012/0223665 A1 9/2012 Wilharm
2013/0106333 A1* 5/2013 Durkee .................. H02P 6/186
318/400.33

* cited by examiner

APPARATUS EMPLOYING COIL INDUCTANCE DETERMINATION AND METHOD FOR OPERATING THE APPARATUS

CROSS REFERENCE TO RELATED APPLICATIONS

The present application is a U.S. National Phase Application pursuant to 35 U.S.C. § 371 of International Application No. PCT/EP2014/059153 filed May 6, 2014, which claims priority to European Patent Application No. 13166900.4 filed May 7, 2013. The entire disclosure contents of these applications are herewith incorporated by reference into the present application.

TECHNICAL FIELD

The invention relates to an apparatus comprising an electric motor with a stator, an armature, especially a rotor, and at least one coil. The invention further relates to a method for operating such an apparatus.

BACKGROUND

Electric motors, especially brushless DC motors are used as actuators in medical devices. For example, an electric motor may be provided in a liquid drug delivery device to actuate the drug delivery. The dose of the drug delivered to a patient may then be directly dependent on the motor rotation, so that a precise control of the motor rotation is crucial for these applications. The input signal for the motor control is usually the position of the armature, which in the art is often evaluated optically or magnetically with an additional sensor on the motor. Additional sensors, however, require additional components and therefore increase costs. They also may compromise the device robustness to malfunctions since extra components may cause additional functional failures.

There are known sensor-less motor control systems, which make use of electromotive force measurements. The measurement of the electromotive force works well for high speed (high rpm), but less for low speed (low rpm) motors. For some applications, such as drug delivery devices, it is however necessary to precisely control the motor also at low speed.

SUMMARY

It is therefore an object of the present invention to provide for a motor driven apparatus with a precise motor control also at low speed, that does not require additional sensors.

This object is at least in part solved by an apparatus comprising an electric motor with a stator, an armature, especially a rotor, and at least one coil, wherein the apparatus further comprises detection means configured to determine the inductance L of the coil by measuring at least one electrical quantity related to the coil during operation of the motor. By provision of such detection means, the coil inductance L is determinable during motor operation and operation parameters of the motor such as the current armature position may be calculated therefrom.

The object is furthermore at least in part solved by a method for operating such an apparatus, wherein the detection means of the apparatus determine the induction L of the coil and/or the position of the armature as a function of the inductance L of the coil by measuring at least one electrical quantity related to the coil during operation of the motor.

It was found that by determining coil inductance L during motor operation, the armature position may be determined precisely enough for applications in, for example, drug delivery devices. Moreover, the inductance L was found to be determinable during operations by measuring an electrical quantity related to the coil and without making use of additional sensing means like for example optical or magnetic sensors which are otherwise used to for example control the armature position.

The apparatus comprises an electric motor with a stator, an armature and at least one coil. The electric motor may be a rotary motor with a stator and a rotor, but also a linear motor with a stator and a linear moving armature. In particular, the motor may be a DC motor, especially a brushless DC motor, as often used in medical devices. The motor may be powered by line current or mobile power modules such as batteries and be controlled, for example, by pulse width modulation. The coil of the motor serves to generate a magnetic field within the motor and may be situated on the stator or on the armature. In case of a rotary motor, the coil may for example be situated on the rotor.

The motor is preferably configured to work at a speed of between 0.01 and 20000 rpm, preferably, of between 0.1 and 1000 rpm, more preferably of between 1 and 10 rpm. This motor speed is typically used for example in medical delivery devices.

The apparatus further comprises detection means. These detection means may for example comprise a circuitry connected to the circuitry for operating the motor. For example the detection means may comprise an integrated circuit or analog electronics or a combination thereof. The detection means are configured to determine the inductance L of the coil. The inductance L of the coil depends on the one hand on predetermined coil parameters such as the number of windings, the dimensions of the coil, the coil core or the like, and on the other hand on (time-dependent) magnetic characteristics of the coil environment such as especially the relative spatial orientation of the coil to armature, permanent magnets and/or other ferro-, para- or diamagnetic components of the apparatus, especially of the motor. The variation of inductance L over time therefore contains information about the armature position, i.e. about the relative spatial orientation of the coil to the armature (if the coil is on the stator) or about the relative spatial orientation of the coil to the stator (if the coil is on the armature).

The detection means are configured to determine inductance L of the coil by measuring at least one electrical quantity related to the coil. The electrical quantity may in particular be the discharge current of the coil (coil current) and/or the voltage over the coil (coil voltage). For example the detection means may comprise an ammeter circuitry or a voltmeter circuitry for measuring a respective current or voltage. The at least one electrical quantity is to be measured during motor operation. Therefore, the detection means have to be configured such to allow a measurement during motor operation. In particular, the detection means comprise a control configured to perform the measurement during motor operation. Motor operation in this context especially means that the armature is in motion, for example that the rotor of a rotary motor rotates relative to the stator.

Further embodiments of the apparatus and of the method will be described in the following. The features and advantages of these embodiments are understood to apply for the apparatus and the method alike, even if they are described only for one of them.

According to an embodiment of the apparatus, the detection means are further configured to determine the position of the armature as a function of the inductance L of the coil during operation of the motor, especially when the armature is in motion. Since coil inductance L is especially a function of the coil's spatial relative position to armature, magnets and components in the coil environment, the armature position of the electric motor is determinable from time-dependent inductance L. In case of a rotary motor with the coil being situated on the stator, the rotor rotation for example changes the relative position of a magnet on the rotor to the coil on the stator, thereby influencing coil inductance L so that the rotor position is determinable by a time-dependent measurement of coil inductance L.

The specific relation between coil inductance L and armature position for a specific motor geometry may be determined by computer simulations, analytics, experimental measurement or any combination thereof. For example, the relation between coil inductance and armature position may be stored in a lookup table on storage means of the apparatus so that during operation the current armature position may be deduced by a comparison of the lookup table with the current coil inductance measurement.

It is understood that for determining the armature position as a function of coil inductance L it is not necessary to first explicitly calculate and/or output the actual value of inductance L by for example storing this value into a variable in a specific memory location. Rather, the determination of inductance L may be implicitly or explicitly incorporated into the determination of the armature position, such that the value of inductance L may only appear as part of a formula to determine the armature position. For example, the relation of inductance L as a function of the electrical quantity may be inserted into the relation of the armature position as a function of coil inductance L yielding a relation of the armature position as a function of the electrical quantity.

According to an embodiment of the apparatus, the apparatus further comprises a pulse width modulation (PWM) circuitry configured to control the electric motor, wherein the pulse width modulation circuitry is configured to connect the coil to a voltage supply during charge time periods $T_{on}$ and to disconnect the coil from the voltage supply during discharge time periods $T_{off}$, and wherein the detection means are configured to determine a discharge current from the coil during discharge time periods $T_{off}$.

According to a corresponding embodiment of the method the electric motor is controlled by PWM and the detection means determine a discharge current from the coil during at least one discharged time period $T_{off}$ of the PWM.

PWM is a widely used method for motor control, in which the average value of a voltage (and current) fed to the motor is controlled by turning one or more switches switch between a voltage supply and the motor on and off at a fast pace, so that the longer the switch-on periods $T_{on}$ are compared to the switch-off periods $T_{off}$, the higher is the power supplied to the motor. The PWM is relatively energy saving, allows a decent control of the motor and may be largely integrated in digital electronics. The electronic switches used for the PWM may be for example transistors, IGBTs or MOSFETs.

Due to the high frequency of the PWM, in which the PWM turns the switch or the switches from off to on or vice versa, it is however challenging to determine information about the electric motor during operation since measurements are interfered by the PWM frequency and its harmonics. The PWM period, i.e. the time period between two consecutive switching's from off to on (which equals the sum of one $T_{on}$ and one $T_{off}$ period), is preferably between 0.2 ms and 100 ms, more preferably between 0.4 ms and 10 ms, for example about one millisecond.

It was found, that a very precise measurement of coil inductance L is possible by determining a discharge current from the coil during the discharge time periods $T_{off}$ of the PWM.

During the $T_{on}$ time periods the coil is connected to a voltage supply so that the current through the coil gradually increases. When the PWM switches from $T_{on}$ to $T_{off}$, the voltage supply is disconnected from the coil and the coil is instead connected with a discharge circuitry having a total resistance R, so that the coil discharges and the current through the coil gradually decreases again. The increasing and decreasing current through the coil is referred to as charge current and discharge current, respectively.

According to an embodiment of the apparatus the detection means are configured to determine a length of time for a discharged current from the coil dropping from a first given current value to a second given current value.

According to a corresponding embodiment of the method the detection means determine a length of time for a discharge current from the coil dropping from a first given current value to a second given current value.

The current decrease during the $T_{off}$ periods is generally given by the discharge current formula $$I(t)=I_0 \cdot \exp(-t \cdot R/L), \qquad (1)$$

wherein I(t) is the time-dependent discharge current, $I_0$ is the coil current at the beginning of the respective interval $T_{off}$, R is the resistance of the discharge circuitry via which the coil discharges, L is the coil inductance and t is the time passed since the coil is being discharged, i.e. since the coil is connected to the discharge circuit in particular at the beginning of the respective interval $T_{off}$.

With two given pairs of values $(t_1, I(t_1))$, $(t_2, I(t_2))$ inductance L may be calculated by means of the following formula:

$$L = \frac{\Delta t \cdot R}{\ln(I_1/I_2)}, \qquad (2)$$

wherein $\Delta t = t_2 - t_1$ and R is the resistance via which the coil discharges. Thus, L may be determined from the length of time interval $\Delta t$ in which the discharge current drops from a first given current value $I_1$ to a second given current value $I_2$.

The first and second current values $I_1$ and $I_2$ may for example be given as a percentage of the maximum discharge current $I_0$ at the beginning of respective time period $T_{on}$. For example the first and second current values may be selected to be 100% and 80% of $I_0$, respectively. Of course it is also possible to set $I_1$ less than 100% of $I_0$ such as for example 90%.

According to an embodiment of the apparatus the detection means are configured to drain a discharge current from the coil through a variable electric resistance provided by a variable resistance circuitry comprising at least one resistor, wherein the variable resistance circuitry is adjustable to provide at least two different electric resistance values. In particular, the detection means may further be configured to determine a voltage over at least one resistor of the variable resistance circuitry for each one of the at least two different electric resistance value.

According to a corresponding embodiment of the method the detection means at least twice drain a discharge current from the coil through a variable electric resistance provided by a variable resistance circuitry comprising at least one resistor and measure a voltage over at least one resistor of the variable resistance circuitry, wherein at the first time the variable resistance circuitry provides the first electric resistance value and wherein at the second time the variable resistance circuitry provides a different second electric resistance value.

For a very precise determination of coil inductance L according to formula (2) the total resistance of the discharge circuit has to be known with high precision. This is sometimes a problem since this resistance may be unknown or not known precisely enough. The embodiments of the apparatus and the method described beforehand allow precise determination of inductance L even if the absolute value of total resistance R is not known.

Let $R_1$ be a first and $R_2$ be a second electric resistance value provided by the variable resistance circuitry. The respective total resistance value of the discharge circuit, over which the coil is discharged, is then given by $R_a = R + R_1$ and $R_b = R + R_2$, wherein R is an unknown (or imprecisely known) additional resistance of the discharge circuit in series with the first or second resistance of the variable resistance circuitry.

According to formula (2), the following applies for a time measurement for each of the two electric resistance values of the variable resistance circuitry:

$$L_a = \frac{\Delta t_a \cdot R_a}{\ln(I_1/I_2)}, L_b = \frac{\Delta t_b \cdot R_b}{\ln(I_1/I_2)}, \qquad (3,4)$$

Under the assumption that $L_a \approx L_b$, which is fulfilled when $L_a$ and $L_b$ are both determined within a time period relatively short compared to the motor speed, the unknown or imprecisely known resistance R may be eliminated by combining formulas (3) and (4), so that L is determinable from the relative difference $\Delta R = R_b - R_a$ by the following formula:

$$L = \frac{\Delta t_a \cdot \Delta t_b \cdot \Delta R}{(\Delta t_a - \Delta t_b) \cdot \ln(I_2/I_1)}. \qquad (5)$$

Thus, inductance L in formula 5 does not dependent on the unknown resistance R, but only on a known difference $\Delta R$ between the first and the second electrical resistance values of the variable resistance circuitry.

The variable resistance circuitry may for example comprise a potentiometer or two parallel sub-circuits with different resistances, wherein at each time one of the two sub-circuits is selectable by a switch. In particular, the variable resistance circuitry may comprise a series connection of at least two resistors, wherein one of these resistors may be short circuited by a switch.

The discharge current and time periods for the two different electric resistance values of the variable resistance circuitry may be measured in a single $T_{off}$ period or in separate $T_{off}$ periods, for example in two consecutive $T_{off}$ periods.

According to an embodiment of the method the detection means determine a first length of time for a discharge current from the coil dropping from a first given current value to a second given current value, while the variable resistance circuitry provides the first electric resistance value, and the detection means determine a second length of time from a discharged current from the coil dropping from a third given current value to a fourth given current value, while the variable resistance circuitry provides the second electric resistance value, and the detection means determines the inductance L of the coil and/or the position of the armature as a function of the first and the second length of time. This embodiment allows for example performing the two time measurements during a single $T_{off}$ period so that coil inductance L may be precisely determined in a very short time.

According to an embodiment of the apparatus the PWM circuitry comprises at least one electric switch to selectively connect the motor to a voltage source and the switch comprises an inverse series connection of two MOSFETs.

MOSFETs may be used as electric switches for a PWM control to connect and disconnect a coil to and from a voltage source. However, MOSFETs have a parasitic body diode behavior, so that during the discharge time periods $T_{off}$ part of or the complete discharge current from the coil may flow over the open MOSFET switch instead of a designated discharge circuitry. Such a parasitic discharge current drain over the MOSFET switch is reduced or even prevented by providing an inverse series connection of two MOSFETs for one switch. In particular, an inverse series connection of two MOSFETs may be used for the low-side switches of a PWM H bridge.

An inverse series connection of two MOSFETs is understood to mean that two MOSFETs are connected in series, wherein either the respective sources/drains of two re-channel- or two p-channel-MOSFETs are connected to each other or wherein a source/drain of an n-channel-MOSFET is connected in series to a drain/source of a p-channel-MOSFET, respectively. This combination of two MOSFETs removes the parasitic diode behavior as due to the inverse series connection provides for an inverse pre junction in either direction when the MOSFETs are open, thus blocking the discharge current from the coil.

According to an embodiment of the apparatus the apparatus comprises processing means and storage means containing commands, the execution of which on the processing means causing a method according to the embodiments described above to be performed.

The processing means may for example comprise an integrated circuit, especially a processor, or analog or semi-analog electronics or any combination thereof. The storage means may comprise volatile, permanent or transient storage means such as RAMs, ROMs, hard disks, flash memory etc.

With the embodiment described in beforehand, the apparatus may be operated according to predefined methods, the advantages of which are described in the context of the method according to this disclosure and to its embodiments so that reference is made thereto.

According to an embodiment of the apparatus the apparatus is a medical device, especially a drug delivery device. Precise motor control is especially important for medical devices, and more especially for drug delivery devices, in which for example the amount of the drug delivered to a patient depends on the motor rotation. With the apparatus according to this embodiment it is possible to precisely control the motor speed by the armature position of the motor and therewith improve the reliability and precision of the delivered medicament.

According to an embodiment of the apparatus the apparatus is a hand-held device. Motors of hand-held devices are usually powered by batteries and use energy saving PWM control. Thus, the embodiments of the apparatus as described above are in particular suitable for such hand-held devices.

Further features and advantages of the apparatus and of the method will now be explained in connection with exemplary embodiments, wherein reference is made to the figures.

BRIEF DESCRIPTION OF THE FIGURES

In the figures

DETAILED DESCRIPTION

Figure 1A:
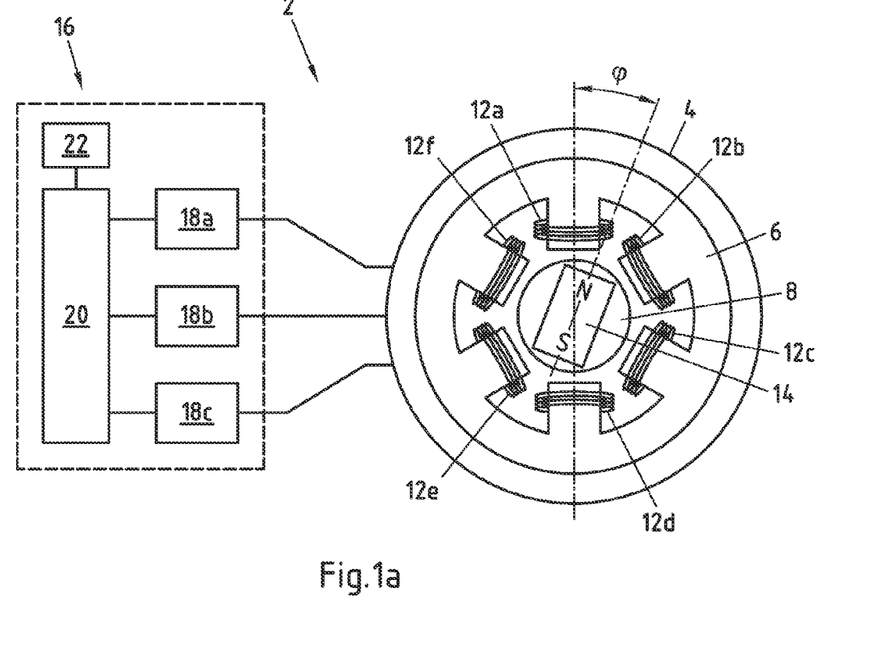
FIG. 1a shows a schematic diagram of an exemplary embodiment of an apparatus comprising a rotary motor with three pairs of stator coils.

FIG. 1a shows a schematic diagram of an exemplary embodiment of an apparatus according to this disclosure. The apparatus 2 comprises an electric motor 4, which in this example is a rotary motor with a stator 6 and a rotor 8 as armature. A first pair of coils 12a+d, a second pair of coils 12b-e and a third pair of coils 12c+f are situated on the stator 6, and a permanent magnet 14 is situated on the rotor 8 of motor 4.

The inductances $L_{a-f}$ of coils 12a-f are a function of the relative spatial position to magnet 14 and therewith functions of the angular position of the rotor 8 relative to the stator 6, which is denoted by angle φ as depicted in FIG. 1a.

Figure 1B:
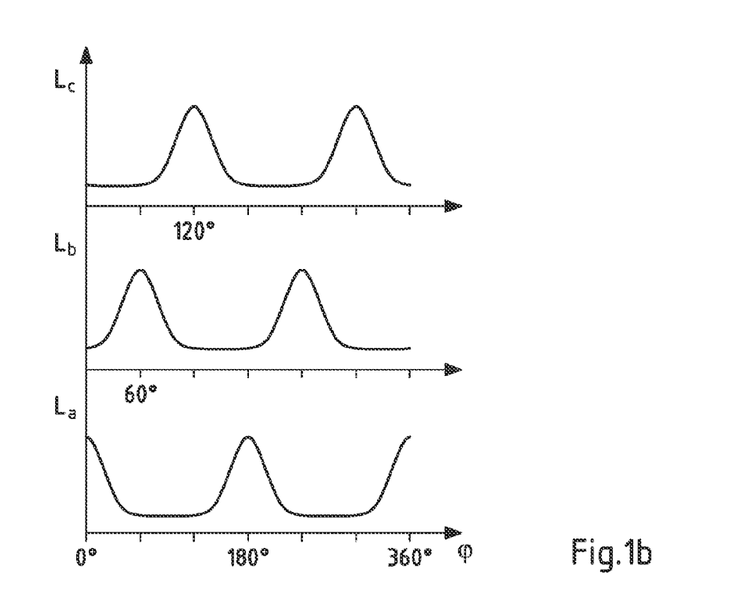
FIG. 1b shows a schematic graph of the time-dependent inductance for three coils of the motor in FIG. 1a, FIG. 2 shows a schematic circuitry diagram with a general circuitry according to an embodiment of the apparatus.

FIG. 1b shows schematic graphs of the angle-dependent inductance $L_{a-c}$ for the three adjacent coils 12a-c. The inductance of a coil is highest when the magnetic field of the coil is directly opposite to the magnetic field of magnet 14, i.e. when magnet 14 is in line with the coil and has opposite polarity, so that either two magnetic north poles or two magnetic south poles face each other. For coil 12a this is the case for an angle φ of 0°, 180° and 360°, so that FIG. 1b shows an inductance maximum of $L_a$ at these angles. The inductance maxima of $L_b$ and $L_c$ are shifted by 60° and 120° due to the corresponding position of coils 12c and 12e on the stator 6

Apparatus 2 comprises detection means 16 with first, second and third inductance detection means 18a-c configured to determine these angle-dependent inductances $L_{a-c}$ of coils 12a, 12c and 12e during operation, i.e. when the rotor 8 is in motion. Due to the angle dependence of the coil inductances, the current rotor position φ may be calculated as a function of one or more of the measured coil inductances. For this purpose, apparatus 2 further comprises processing means 20 and storage means 22, wherein information about the angular dependence of the inductances $L_{a-c}$ are stored in the storage means 22 in the form of a look-up table and wherein the processing means 20 are configured to compare the inductances $L_{a-c}$ determined by inductance detection means 18a-c with the look-up table to determine the angular position of rotor 8.

The thus determined current angular position φ of the rotor 8 may then be used, for example, to control the speed of motor 4.

A possible implementation of the inductance detection means 18a-c will now be illustrated with reference to FIG. 2.

Figure 2:
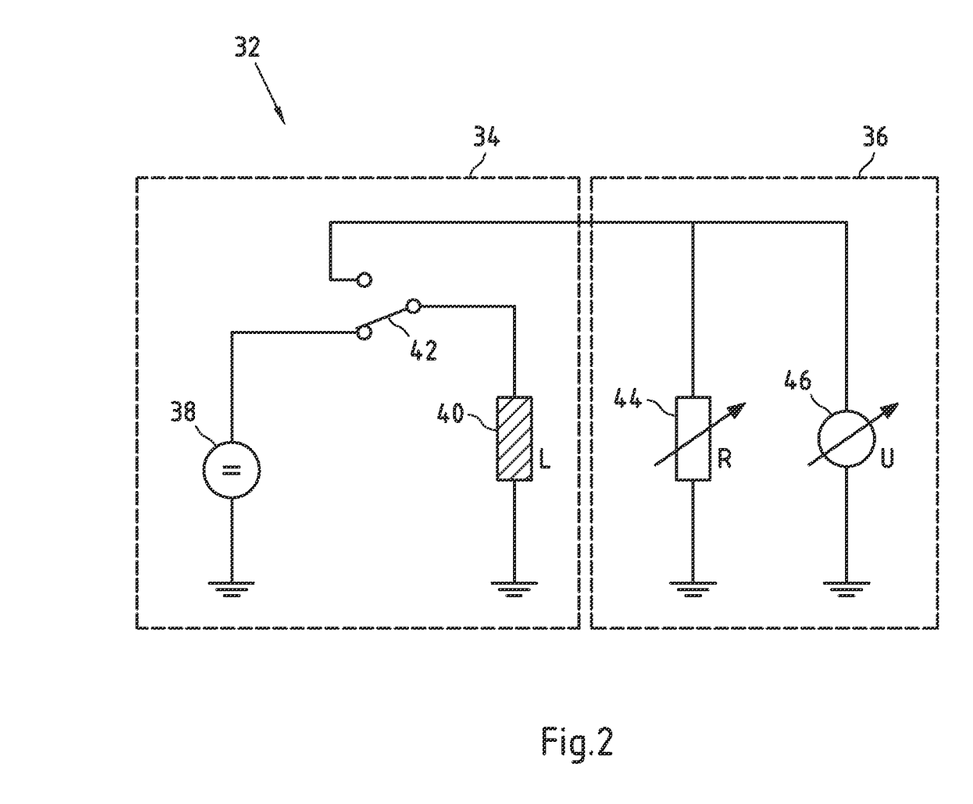

FIG. 2 shows a schematic diagram of a general circuitry 32 for determining the inductance L of a coil. The left sub-circuitry 34 of circuitry 32 represents part of the motor control and the right sub-circuitry 36 of circuitry 32 represents inductance detection means like the inductance detection means 18a-c in FIG. 1.

Sub-circuitry 34 comprises as voltage supply a DC voltage source 38 connectable to a coil 40 of an electric motor by means of an electronic switch 42. Coil 40 may be situated on the armature or on the stator of the motor, for example like one of stator coils 12a-f in FIG. 1a.

The motor is controlled by a PWM circuitry (not shown) operating switch 42 such, that coil 40 is connected to voltage source 38 during charge time periods $T_{on}$ and is disconnected from voltage source 38 during discharge time periods $T_{off}$.

At least during discharge time periods $T_{off}$, coil 40 is connectable to sub-circuitry 36 so that the inductance of coil 40 may be determined during these periods by measuring with sub-circuitry 36 an electric quantity related to the coil.

In the example illustrated in FIG. 2, sub-circuitry 36 is configured to determine the discharge current draining from coil 40 over switch 42 to sub-circuitry 36 as electrical quantity related to the coil. For that purpose, sub-circuitry 36 comprises a resistance circuitry, which preferably is a variable resistance circuitry 44 that can provide at least two different electrical resistance values, and a voltage measurement circuitry 46 to determine the voltage over resistance circuitry 44 (as illustrated in FIG. 2) or over at least one resistor of the resistance circuitry 44. With a voltage measurement by means of voltage measurement circuitry 46 the discharge current draining through resistance circuitry 44 can then be determined according to Ohm's law I=U/R, wherein I is the discharge current, U is the measured voltage and R is the resistance of resistance circuitry 44 or of the at least one resistor of the resistance circuitry 44, respectively.

During operation, when switch 42 is in the on-position during time periods $T_{on}$ (as shown in FIG. 2), coil 40 is connected to voltage source 38, so that a gradually increasing charge current flows from voltage source 38 to coil 40. When switch 42 is in the off-position during time periods $T_{off}$, a gradually decreasing discharge current flows from coil 40 over resistance circuitry 44. The time-dependence of the discharge current I(t) corresponds to formula (1) as described above.

By measuring time length Δt, in which the discharge current I(t) falls from a first given value $I_1$ to a second given value $I_2$, the current inductance L of coil 40 is determinable with formula (2) as described above.

With a variable resistance circuitry 44 (as illustrated in FIG. 2) the inductance L may be precisely determined even if the absolute electric resistance value of the discharge circuitry is not known or not known precisely enough. For this purpose, variable resistance circuitry 44 is controlled to provide one after another two different electric resistance values $R_a$ and $R_b$ and for each case the according time length $\Delta t_a$ and $\Delta t_b$ is measured, in which the discharge current falls from a first given value $I_1$ to a second given value $I_2$. The inductance L of coil 40 is then determinable with formula (5) as described above.

Experiments have shown that in this way the coil inductance L may be determined with an error margin of about 1%. For an inductance L=500 µH and a sub-circuitry 36 configured such that $\Delta R=1\Omega$ and $I_2/I_1=1.1$, time measurements of the discharge current falling from $I_1$ to $I_2$ for each resistance value $R_1$, $R_2$ yielded the following results: $\Delta t_a=17.04$ µs, $\Delta t_b=12.52$ µs. Application of formula (5) yields an inductance of about 495.2 µH which is less than 1% error from the real inductance value of 500 µm.

Figure 3:
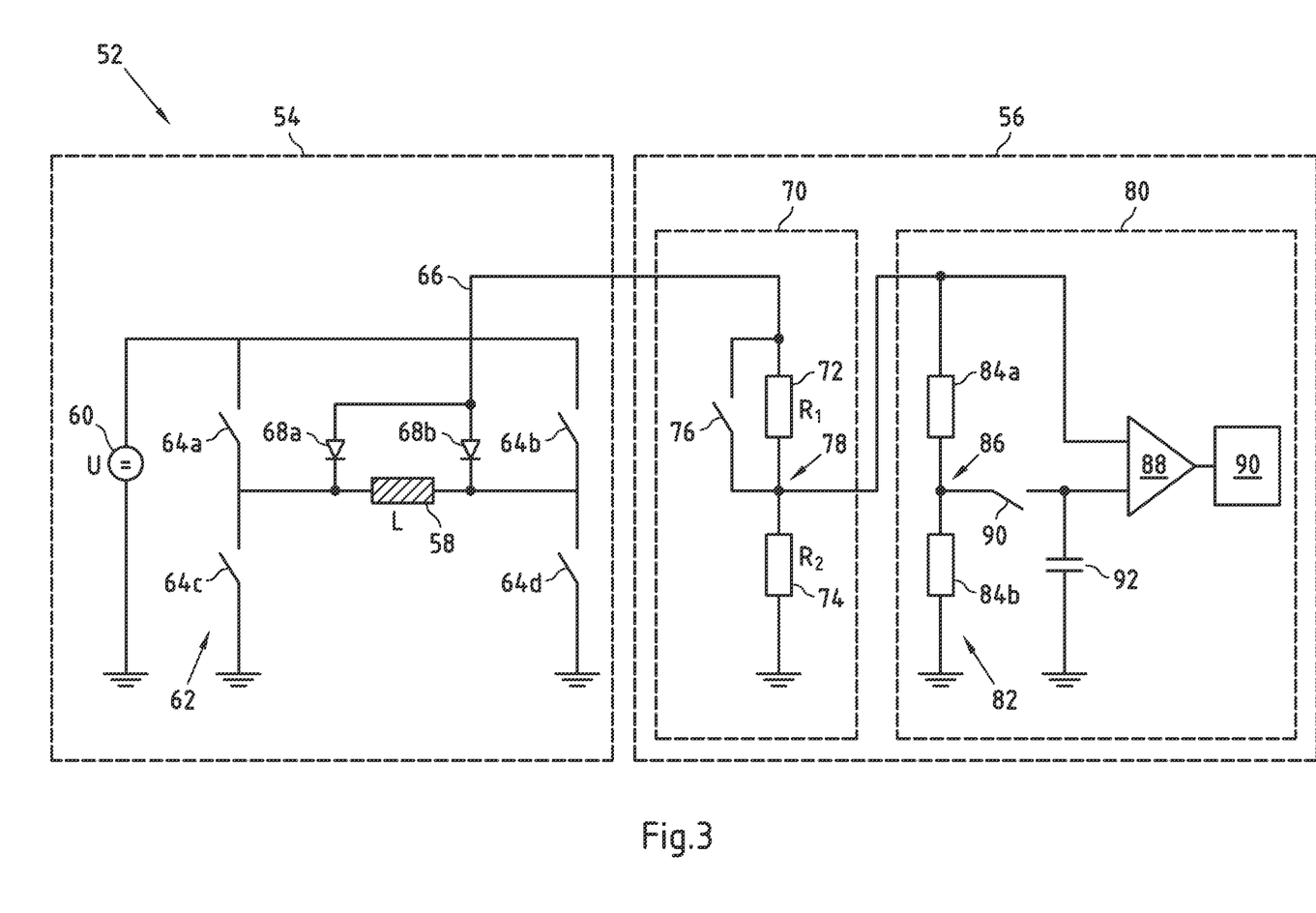
FIG. 3 shows a schematic circuitry diagram according to a more specific implementation of the general circuitry of FIG. 2, FIG. 4a-b show graphs illustrating coil charge and discharge currents of a PWM controlled electric motor such as the motor in FIG. 1.

FIG. 3 shows a schematic circuitry diagram of a more specific implementation of a circuitry 52 for determining the inductance L of a coil.

The left sub-circuitry 54 of circuitry 52 again represents part of the motor control and the right sub-circuitry 56 of circuitry 52 represents inductance detection means like the inductance detection means 18a-c in FIG. 1.

Sub-circuitry 54 comprises a coil 58 of an electric motor which is connectable to a DC voltage source 60 via an H bridge 62 comprising two upper electronic switches 64a-b and two lower electronic switches 64c-d. By means of the H bridge 62 the coil 58 may be connected to DC voltage source 60 in either direction.

By closing for example switches 64a and 64d and opening switches 64c and 64b, a voltage from voltage source 60 may be supplied to coil 58 so that a charge current flows through coil 58. A voltage with opposite polarity may be supplied to coil 58 by opening switches 64a and 64d and closing switches 64c and 64b. Coil 58 may also be disconnected from voltage source 60 by opening both upper switches 64a and 64b.

The motor is controlled by a PWM circuitry (not shown) that may operate switches 64a-d. In particular, the PWM circuitry operates switch 64a such, that coil 58 is connected to voltage source 60 during charge time periods $T_{on}$ and is disconnected from voltage source 60 during discharge time periods $T_{off}$ while coil 58 is connected to ground via switch 64d in each case. For reverse direction of motor rotation, the PWM circuitry may alternatively operate switch 64b such, that coil 58 is connected to voltage source 60 during charge time periods $T_{on}$ and is disconnected from voltage source 60 during discharge time periods $T_{off}$ while coil 58 is connected to ground via switch 64c in each case.

Both terminals of coil 58 are connected to sub-circuitry 56 over two diodes 68a-b, which may be for example Schottky PN-diodes, and a detection line 66. During discharge time periods $T_{off}$ (when both upper electronic switches 64a-b are open) a discharge current flows from one terminal of coil 58 over one of diodes 68a-b in forward direction to sub-circuitry 56. The high-side switches 64a-b and the low-side switch 64c or 64d on the side of this particular diode are controlled to be open, while the other low-side switch 64d or 64c is closed to connect the opposite terminal of coil 58 to ground potential. In this way, the discharge current of coil 58 may be drained to sub-circuitry 56 independent of the coil polarity. Low-side switches 64c-d are configured not to have a parasitic diode, so that coil is not short-circuited over ground. For example switches 64c-d may each be implemented as an inverse series connection of two MOSFETs.

Sub-circuitry 56 is configured to determine inductance L of coil 58 according to formula (5) as described above. For this purpose, sub-circuitry 56 comprises a variable resistance circuitry 70, which can provide two different electrical resistance values $R_a$ and $R_b$, and an inductance determination circuitry 80. This inductance determination circuitry 80 is configured to measure the time lengths $\Delta t_a$ and $\Delta t_b$, which the respective discharge currents draining over $R_a$ or $R_b$, respectively, take to fall from a first given value $I_1$ to a second given value $I_2$.

Variable resistance circuitry 70 comprises a series connection of two resistors 72, 74, wherein a switch 76 is connected in parallel to resistor 72. When switch 76 is open, the total resistance value $R_a$ of variable resistance circuitry 70 is given by $R_a=R_1+R_2$, and when switch 76 is closed the total resistance value $R_b$ of variable resistance circuitry 70 is given by $R_b=R_2$. As can be seen from formula (1), the lower is the resistance of the discharge circuit the faster the discharge current decreases. Therefore, discharge current from coil 58 decreases faster when switch 76 is closed.

Inductance determination circuitry 80 is connected to the connection point 78 of the two resistors 72, 74 and switch 76, wherein the voltage at this connection point 78 is related to the discharge current by Ohm's law $I=U/R_2$ (inductance determination circuitry 80 is in particular configured to have a high internal resistance so that the discharge current I(t) drains basically completely through resistor $R_2$).

The inductance determination circuitry 80 comprises a comparator 88 for providing start and stop signals to a clock 90 to subsequently measure time lengths $\Delta t_a$ and $\Delta t_b$ for both resistance values $R_a$ and $R_b$ of variable resistance circuitry 70.

In the example shown in FIG. 3, comparator 88 is configured to trigger clock 90 to start a time measurement once a discharge current drains through sub-circuitry 56 at the beginning of a time period $T_{off}$. Thus, the first current value $I_1$ in this example equals the maximum discharge current value $I_0$. The second current value $I_2$ is defined by means of a voltage divider 82 comprising a series connection of two resistors 84a-b, the connecting point 86 of which being connectable to the comparator 88 over switch 90. Switch 90 and a capacitor 92 provide a sample-and-hold functionality to bias comparator 88 with a fixed ratio by resistors 84a and 84b to define a voltage threshold corresponding to discharge current $I_2$.

The operation of circuitry 52 illustrated in FIG. 3 will now be described in detail with references to FIGS. 4a-b and FIG. 5.

During operation of the motor comprising coil 58, the PWM control connects coil 58 to voltage source 60 during time periods $T_{on}$, so that the current flowing through coil 58 gradually increases (charge current), and disconnects coil 58 from voltage source 60 during time periods $T_{off}$, so that the current flowing through coil 58 flows over variable resistance circuitry 70 and thereby gradually decreases (discharge current). In FIGS. 4a-b, the rectangular signals corresponding to the right ordinate of the graph illustrate the PWM switching between time periods $T_{on}$ and $T_{off}$. FIG. 4a shows a PWM duty cycle of 20% and FIG. 4b shows a PWM duty cycle of 90%, in which the lengths of $T_{on}$ are 20% or 90%, respectively, of one full PWM cycle, which corresponds to $T_{on}+T_{off}$. Generally, the higher is the proportion of $T_{on}$ of the full PWM cycle, the higher is the power transferred to the motor.

Figure 4A:
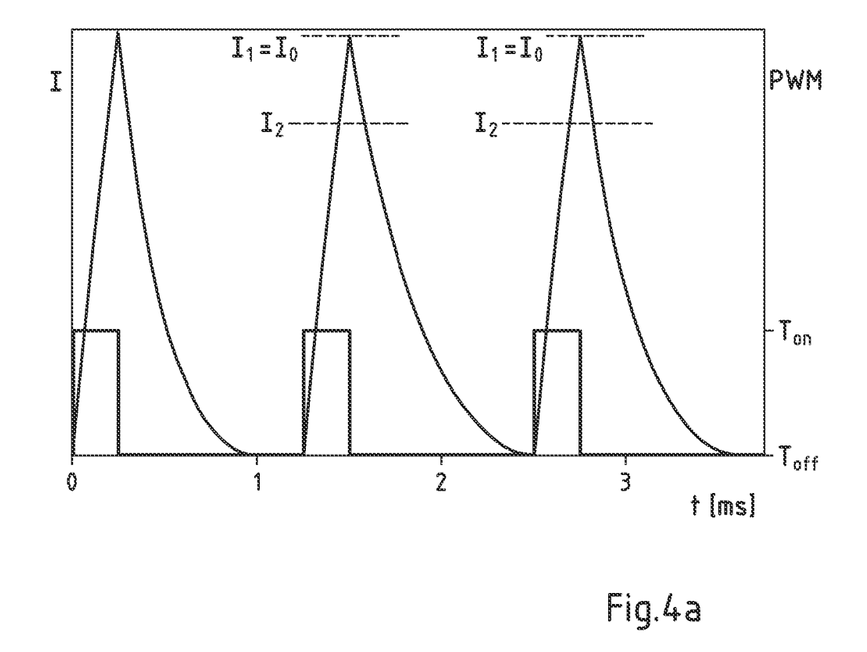
Figure 4B:
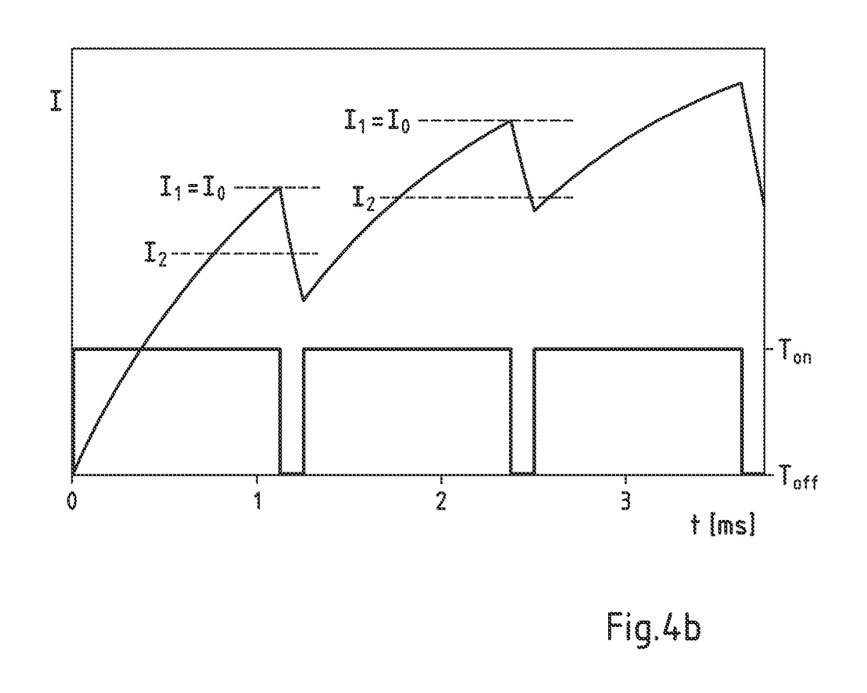
Figure 5A:
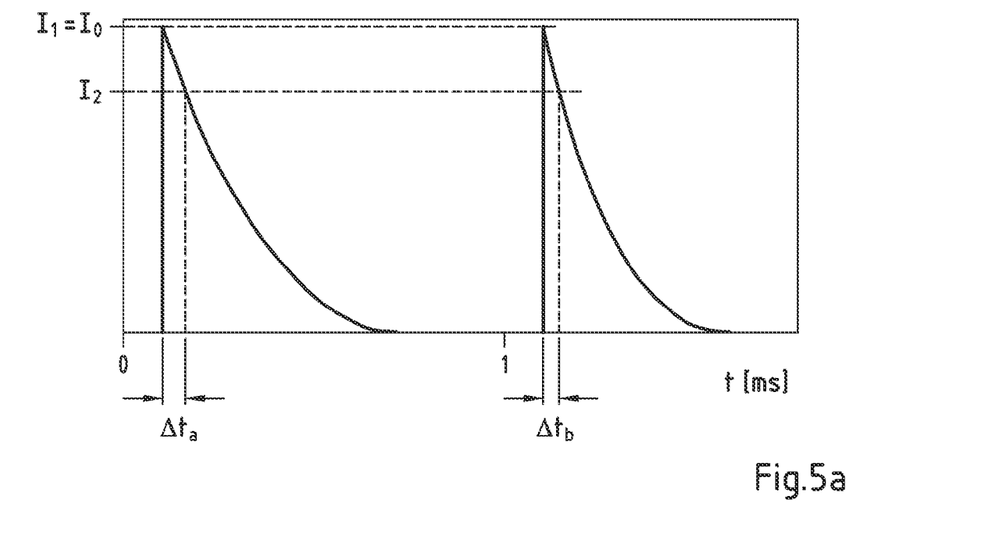
FIG. 5a shows a graph illustrating time length measurements over two PWM cycles for a coil discharge current decay over two different electrical resistances.

FIGS. 4a-b also show the charge and discharge currents of the coil. During $T_{on}$, the coil is connected to a voltage source and a gradually increasing charge current flows through the coil. During $T_{off}$, the coil is instead connected to a discharge circuitry, so that the discharge currents gradually decrease again. For the PWM duty cycle of 90% illustrated in FIG. 4b the time period $T_{off}$ is too short for a complete discharging of the coil, so that the next $T_{on}$ period starts with a current offset and the maximum current value $I_0$ at the beginning of $T_{off}$ gradually increases from one PWM cycle to another.

The time periods $T_{off}$ are used to determine the inductance L of coil 58 by means of sub-circuitry 56. During a first time period $T_{off,a}$, switch 76 is controlled to be open, so that the discharge current discharges over the sum resistance $R_a = R_1 + R_2$ of the variable resistance circuitry. During a subsequent second time period $T_{off,b}$, switch 76 is controlled to be closed, so that the discharge current discharges over sum resistance $R_b = 0 + R_2$. FIG. 5a shows the discharge current during the two consecutive time periods $T_{off,a}$ (left in FIG. 5a) and $T_{off,b}$ (right in FIG. 5a). Since $R_b < R_a$ the discharge current decays faster during the second time period $T_{off,b}$ compared to the first time period $T_{off,a}$.

At the beginning of each time period $T_{off,a}$ and $T_{off,b}$, clock 90 is triggered to start a time measurement $\Delta t_a$ and $\Delta t_b$, respectively, so that the first given current value $I_1$ for the time measurements is set equal to the maximum discharge current $I_0$ in this example.

At the same time, switch 90 is closed but for a moment to provide the comparator with a voltage bias which due to the voltage divider 82 equals a defined proportion of the voltage at connection point 78 at the beginning of the respective time period $T_{off}$. The voltage at connection point 78 at the beginning of the respective time period $T_{off}$ corresponds to the maximum discharge current $I_0$. The voltage bias provided at comparator 88 corresponds to an according proportion $I_2$ of the maximum discharge current $I_0$. For example, if the electrical resistance value of resistor 84a is set 25% of the electrical resistance value of resistor 84b, the voltage bias at comparator 88 is set 80% of the respective voltage at connection point 78 which then corresponds to a discharge current value $I_2$ of 80% of the maximum discharge current $I_0$.

It is preferred to set $I_1$ and $I_2$ to proportions of $I_0$ of the current PWM cycle rather than using fixed current values since this accounts for a possible increase of $I_0$ at high PWM duty cycles from one PWM cycle to another as for example shown in FIG. 4b.

Once the discharge current and therewith the voltage at connection point 78 drops below the threshold given by the voltage bias at the comparator 88, the comparator 88 triggers the clock 90 to stop the time measurement.

After determination of the two time lengths $\Delta t_a$ and $\Delta t_b$ the inductance L of coil 58 may then be calculated according to formula (5) by means of processing means (not shown). Since formula (5) does not depend on the absolute total resistance values of the discharge circuitry, but only on the difference $\Delta R = R_b - R_a = -R_1$, coil inductance L may be calculated with high precision even if the total resistance of the discharge circuitry is unknown or imprecisely known.

Figure 5B:
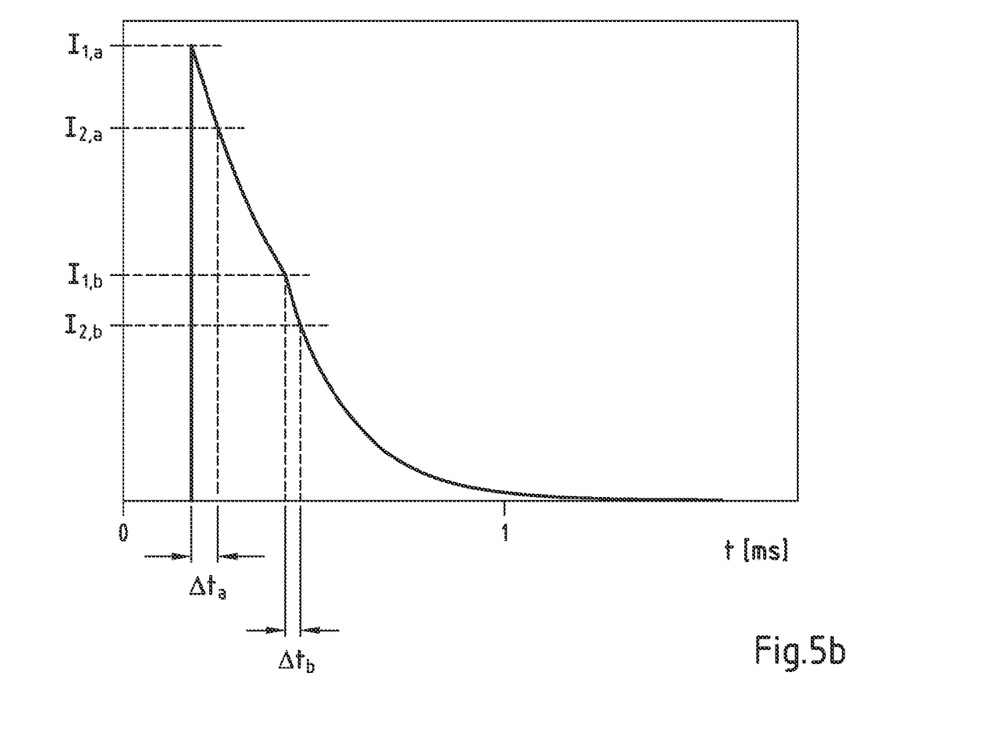
FIG. 5b shows a graph illustrating alternative time length measurements over one PWM cycle for a coil discharge current decay over two different electrical resistances.

FIG. 5b shows a graph illustrating an alternative measurement of time lengths $\Delta t_a$ and $\Delta t_b$ over a single PWM cycle. During the time period $T_{off}$ of the PWM cycle, the variable resistance circuitry 70 first is set to provide electric resistance value $R_a$ and a time measurement of $\Delta t_a$ for the discharge current decreasing from given current values $I_{1,a}$ to $I_{2,a}$ is performed. After the end of this time measurement, variable resistance circuitry 70 is switched to provide electric resistance value $R_b$ and a second time measurement of $\Delta t_b$ is performed for the discharge current further decreasing from given current values $I_{1,b}$ to $I_{2,b}$.

By selecting $I_{1,a}$, $I_{2,a}$, $I_{1,b}$ and $I_{2,b}$ such that $I_{1,a}/I_{2,a} = I_{1,b}/I_{2,b}$ the coil inductance L may still be calculated according to formula (5).

Figure 6:
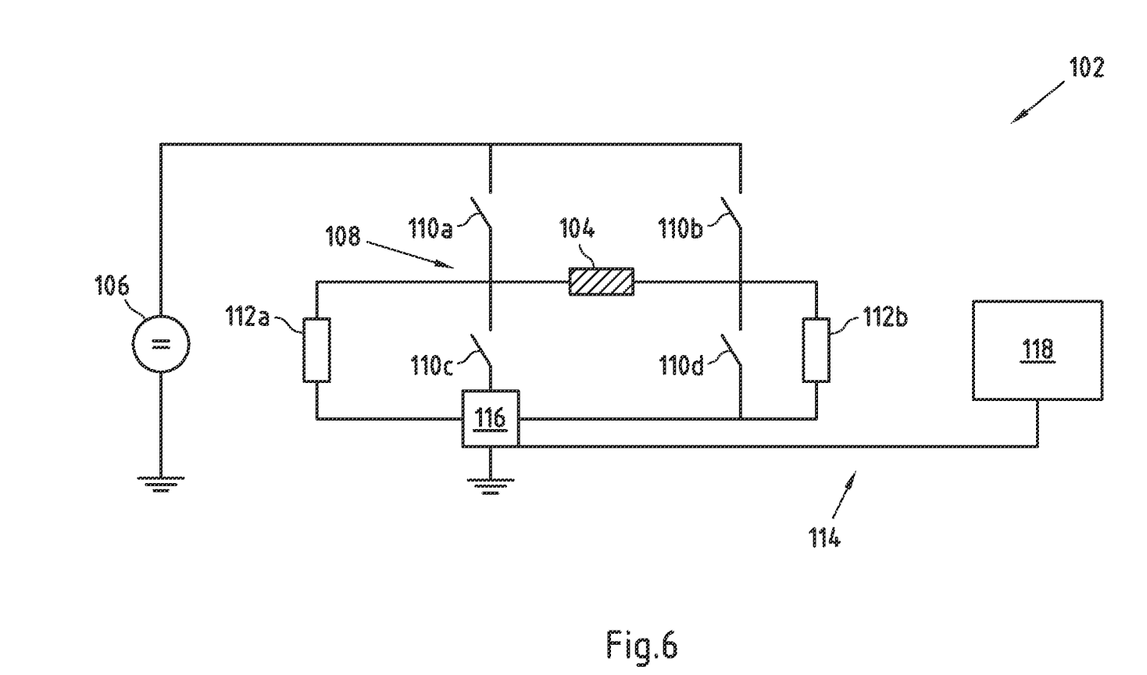
FIG. 6 shows a schematic circuitry diagram with an alternative implementation of the detection means according to the present disclosure.

FIG. 6 shows a schematic circuitry diagram with an alternative implementation of the detection means according to the present disclosure. Circuitry 102 comprises a coil 104 of an electric motor, wherein coil 104 is connectable to a DC voltage source 106 by means of an H bridge 108 with two high-side electronic switches 110a-b and two low-side electronic switches 110c-d. The electronic switches 110a-d are controlled by a PWM circuitry (not shown).

Low-side switches 110c-d are bridged by resistors 112a-b and the lower side of the H bridge 108 is connected to detection means 114 comprising a detection circuitry 116 which is controlled by a micro controller 118.

Detection circuitry 116 may for example comprise a shunt, i.e. a resistor with a resistance value of less than 100 mOhm, to connect the lower sides of switch 110c and resistors 112a-b to ground. The discharge current may than be determined by means of the shunt, for example by determining the voltage drop over the shunt. Alternatively, detection circuitry 116 may comprise two tracks or wires on a printed circuit board (PCB) which are positioned very close to each other. The discharge current may then be determined by inductive coupling of these tracks or wires.

During PWM time periods $T_{on}$, two diagonally opposed switches (110a+d or 110b+c) are closed, the remaining switches being open, and detection circuitry 116 is controlled to only impose a small resistance or even a direct connection between the low-side of the H bridge 108 and ground. In this way, coil 104 is connected to voltage source 106 during time periods $T_{on}$.

During PWM time periods $T_{off}$, the upper side switches 110a-b and at least one of the lower side switches 110c or 110d are open, so that coil 104 is disconnected from voltage source 106 and the discharge current from coil 104 drains through at least one resistor 112a or 112b and through detection circuitry 116. Detection circuitry 116 is then controlled by micro controller 118 to determine the discharge current, and the inductance L of coil 104 may be determined as a function of the discharge current as described before, for example as described in the context of formulas (2) and (5). In particular, AD channels of the microcontroller 118 may be used to perform time measurements $\Delta t_a$ and $\Delta t_b$ and to calculate the inductance L of coil 104 or the position of the armature of a motor, coil 104 may be provided on.

The invention claimed is:

1. An apparatus comprising:
an electric motor comprising:
a stator;
an armature having a rotor,
at least one coil,
a processing means and storage means containing commands;
a detection means configured to determine the inductance L of the coil by measuring at least one electrical quantity related to the coil during operation of the motor; and
a pulse width modulation (PWM) circuitry configured to control the electric motor, wherein the PWM circuitry is configured to connect the coil to a voltage supply during charge time periods $T_{on}$ and to disconnect the coil from the voltage supply during discharge time periods $T_{off}$,
wherein execution of the commands on the processing means causes the detection means of the apparatus to determine the inductance L of the coil and/or the position of the armature as a function of the inductance L of the coil by measuring at least one electrical quantity related to the coil during operation of the motor, wherein the detection means are configured to determine a discharge current from the coil during discharge time periods $T_{off}$, wherein the detection means are configured to drain a discharge current from the coil through a variable electric resistance provided by a variable resistance circuitry comprising a first resistor, a second resistor and at least one switch, wherein the variable resistance circuitry is adjustable via the at least one switch to provide at least two different electric resistance values, wherein the detection means determines a length of time for a discharge current from the coil dropping from a first given current value to a second given current value, and wherein the detection means at least twice drain a discharge current from the coil through a variable electric resistance provided by a variable resistance circuitry comprising a first resistor a second resistor and at least one switch and measure a voltage over at least one of the first resistor and second resistor of the variable resistance circuitry, wherein at the first time the variable resistance circuitry provides a first electric resistance value and wherein at the second time the variable resistance circuitry provides a different second electric resistance value.

2. An apparatus comprising:
an electric motor comprising:
a stator;
an armature having a rotor,
at least one coil,
a processing means and storage means containing commands;
a detection means configured to determine the inductance L of the coil by measuring at least one electrical quantity related to the coil during operation of the motor; and
a pulse width modulation (PWM) circuitry configured to control the electric motor, wherein the PWM circuitry is configured to connect the coil to a voltage supply during charge time periods $T_{on}$ and to disconnect the coil from the voltage supply during discharge time periods $T_{off}$, wherein execution of the commands on the processing means causes the detection means of the apparatus to determine the inductance L of the coil and/or the position of the armature as a function of the inductance L of the coil by measuring at least one electrical quantity related to the coil during operation of the motor, wherein the detection means are configured to determine a discharge current from the coil during discharge time periods $T_{off}$, wherein the detection means are configured to drain a discharge current from the coil through a variable electric resistance provided by a variable resistance circuitry comprising a first resistor, a second resistor and at least one switch, wherein the variable resistance circuitry is adjustable via the at least one switch to provide at least two different electric resistance values, wherein the electric motor is controlled by pulse width modulation and the detection means determines a discharge current from the coil during at least one discharge time period $T_{off}$ of the PWM, and wherein the detection means determines a first length of time for a discharge current from the coil dropping from a first given current value to a second given current value while the variable resistance circuitry provides the first electric resistance value, and the detection means determine a second length of time for the discharge current dropping from a third given current value to a fourth given current value while the variable resistance circuitry provides the second electric resistance value, and the detection means determines the inductance L of the coil and/or the position of the armature as a function of the first and the second length of time.

* * * * *